(No Model.)

R. G. STONE.
WAGON SEAT.

No. 401,079. Patented Apr. 9, 1889.

WITNESSES.

INVENTOR.

UNITED STATES PATENT OFFICE.

ROSCOE G. STONE, OF WARWICK, RHODE ISLAND, ASSIGNOR OF ONE-HALF TO MAYNARD L. STONE, OF SAME PLACE.

WAGON-SEAT.

SPECIFICATION forming part of Letters Patent No. 401,079, dated April 9, 1889.

Application filed January 12, 1889. Serial No. 296,183. (No model.)

*To all whom it may concern:*

Be it known that I, ROSCOE G. STONE, of the town of Warwick, in the county of Kent, in the State of Rhode Island, have invented a certain new and useful Improvement in Wagon-Seats; and I declare the following to be a specification thereof, reference being had to the accompanying drawings.

Like letters indicate like parts.

Figure 1:
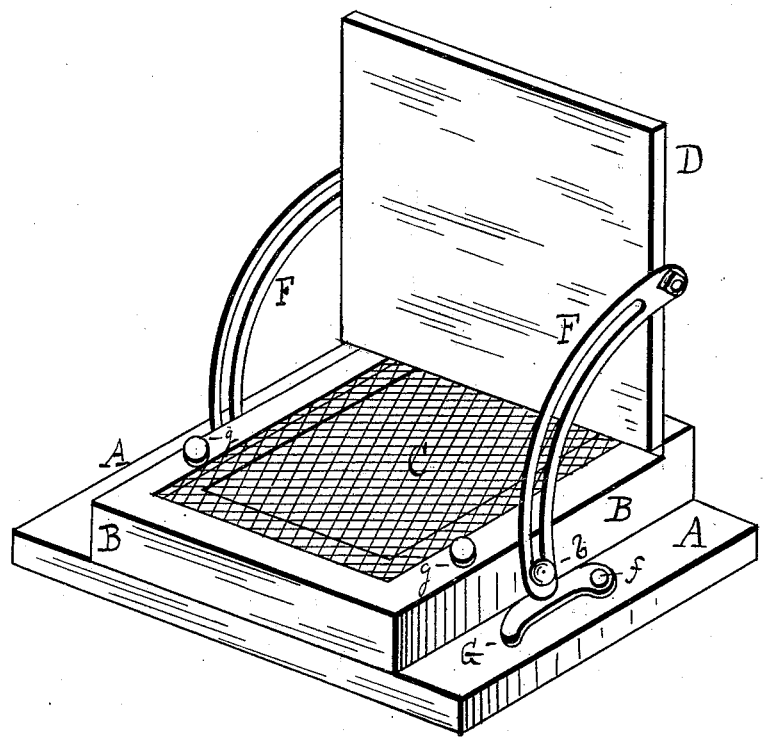
Figure 2:
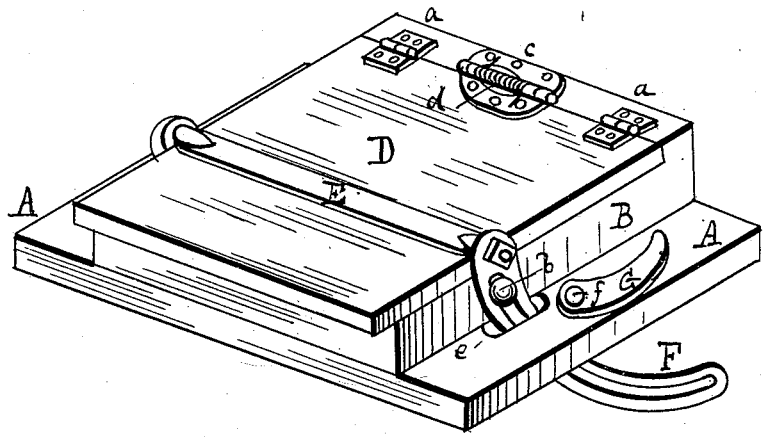

Figure 1 is a perspective view of my improved wagon-seat opened, and Fig. 2 is a perspective view of the same closed.

My invention relates to the seats of wagons and vehicles; and it consists of a seat of suitably-mounted wire-netting, in combination with a hinged cover having slotted guide-bars of quadrant shape and capable of adjustment to form a back for the seat when desired.

In the drawings, A represents the cross-piece or base-board, and B the frame, of my improved seat. A wire-netting, C, stretched across the top of said frame, constitutes the seat proper. A cover, D, is hinged to the frame B, as seen at $a$. A cross-bar, E, fastened to the upper surface of the cover D, passes from side to side and serves to hold the slotted guide-bars F. Said guide-bars F are quadrant-shaped and slide on pins $b$, which are set in the side of the frame B. A hinge, $c$, is placed midway between the hinges $a$, and is furnished with a spiral spring, $d$, one end of which bears on the frame and the other end on the cover, as shown in Fig. 2. The base-board A is slotted at $e$ to allow the guide-bars F to pass through. A stop or rest, G, pivoted at $f$ to the base-board A, can be swung around to the position shown in Fig. 1, so that the lower end of the guide-bar F may rest upon it, by which means the cover D can be kept raised or open. Rubber stops or cushions $g$ are placed on the top of the frame to break the force of the fall when the cover descends.

The purpose of my invention is to provide a dry, cool, and easy seat for drivers and teamsters. In rainy weather a wagon-seat is soon wet and retains the water, so as to be useless as a seat. By using a wire-netting instead of a cushion or board the surface of the seat does not hold the water and remains dry and comfortable notwithstanding its exposure to the weather. The cover D still further protects the seat, and when it is raised or open it forms an easy back for the teamster to lean against. By means of the spring $d$ this cover automatically closes as soon as the driver rises from the seat, or if he desires to have the back continue in its elevated position he can lock it in place by the stop G. The slotted guide-bars F serve to give steadiness to the back and to insure its accurate and proper descent in closing. When they are made of wire, as is preferred, they constitute springs by reason of their arc shape, so that the cover D, when raised, is a spring-back for the seat and yields comfortably to the driver's pressure against it.

The top of the cover, as in Fig. 2, forms an ordinary seat, on which a cushion may be placed and secured, if desired, and the wire seat may be reserved especially for use in stormy weather. The wire-netting, however, makes a cooler seat than a cushion. Such a cover, which can be interchangeably used as a seat or as a seat-back, is a useful device in any open vehicle, and, if desired, the upper surface of said cover may be upholstered.

I claim as a novel and useful invention and desire to secure by Letters Patent—

1. A wagon-seat having a cover hinged thereto and provided with slotted guide-bars of quadrant shape movable on side pins of the seat-frame, so that said cover may be used interchangeably as a seat and a seat-back, substantially as described.

2. The combination of a wagon-seat, a cover hinged thereto and provided with quadrant-shaped slotted guide-bars which are movable on side pins of the seat-frame, and a spring adapted to automatically close said covers, substantially as shown.

3. The combination of the seat-frame B, having the pins $b$, the wire-netting seat C, the hinged cover D, and the slotted quadrant-shaped guide-bars fastened to said cover D, substantially as specified.

4. The combination of the seat-frame B, having the pins $b$, the wire-netting seat C, the hinged cover D, the spring *d*, and the slotted quadrant-shaped guide-bars F, fastened to said cover D, substantially as specified.

5. The combination of a wagon-seat, a back hinged thereto and having curved slotted guide-bars movable on side pins of the seat-frame, a slotted base-board, and a movable stop adapted to swing under the foot of the guide-bar to support the seat-back, substantially as described.

6. A wagon-seat consisting of a frame, B, a wire-netting, C, stretched thereon, and a cover, D, hinged to said frame, substantially as shown.

ROSCOE G. STONE.

Witnesses:
WARREN R. PERCE,
DANIEL W. FINK.